United States Patent [19]

Kipphan et al.

[11] Patent Number: 5,050,994

[45] Date of Patent: Sep. 24, 1991

[54] METHOD OF MONITORING AND/OR CONTROLLING DAMPENING-MEDIUM FEED IN AN OFFSET PRINTING MACHINE

[75] Inventors: Helmut Kipphan, Schwetzingen, Fed. Rep. of Germany; Gerhard Löffler, Walldorf, both of Fed. Rep. of Germany

[73] Assignee: Heidelberger Druckmaschinen AG, Heidelberg, Fed. Rep. of Germany

[21] Appl. No.: 405,639

[22] Filed: Sep. 11, 1989

[30] Foreign Application Priority Data

Sep. 9, 1988 [DE] Fed. Rep. of Germany ....... 3830732

[51] Int. Cl.[5] ...................... G01N 21/55; G01N 21/47

[52] U.S. Cl. .................................. 356/445; 101/147; 356/446

[58] Field of Search ................ 356/445, 446; 250/563; 101/147

[56] References Cited

U.S. PATENT DOCUMENTS

| | | | |
|---|---|---|---|
| 3,053,181 | 9/1962 | Jorgensen | 356/446 |
| 3,234,871 | 2/1966 | Ostwald | 101/142 |
| 4,737,035 | 4/1988 | Aoki et al. | 356/445 |
| 4,876,457 | 10/1989 | Bose | 250/563 |

FOREIGN PATENT DOCUMENTS

| | | |
|---|---|---|
| 569356 | 7/1985 | Australia . |
| 8182887 | 3/1987 | Australia . |
| 0011376 | 10/1983 | European Pat. Off. . |
| 0283899 | 9/1988 | European Pat. Off. . |
| 80046 | 11/1971 | Fed. Rep. of Germany . |
| 2141247 | 3/1972 | Fed. Rep. of Germany . |

OTHER PUBLICATIONS

Publication Fogra-Instituts Bulletin, Special Edition, Wirz et al: "Cooperation of Printing Ink and Water in Offset Printing"; 1979, pp. 45-60.

"Advances in Printing Science and Technology"; 17th International Conference of Printing Research Institutes, Saltsjöbadan, Sweden, Jun. 1983, W. H. Banks, pp. 206-227.

*Primary Examiner*—Vincent P. McGraw
*Assistant Examiner*—LaCharles P. Keesee
*Attorney, Agent, or Firm*—Herbert L. Lerner; Laurence A. Greenberg

[57] ABSTRACT

A method of monitoring dampening-medium feed in an offset printing machine includes scanning non-printed areas in a region of given inked areas by a device of an opto-electric transducer, and evaluating signals generated by the scanning; and a device for performing the foregoing method.

32 Claims, 12 Drawing Sheets

METHOD OF MONITORING AND/OR CONTROLLING DAMPENING-MEDIUM FEED IN AN OFFSET PRINTING MACHINE

The invention relates to a method of monitoring dampening-medium feed in an offset printing machine. In an offset process, a deficiency of dampening medium or dampening solution results in streaks and irregularly distributed ink dots at locations which would otherwise be ink-free if the quantity of dampening medium were correct. Such ink deposits, which occur due to a deficiency of dampening medium appear initially behind areas with large area coverage (as viewed in the paper travel direction) when a deficiency of dampening medium begins. As the deficiency of dampening medium further increases, the area of the ink deposits becomes greater until this so-called scumming extends also to other, otherwise non-printed or ink-free areas.

The beginning of scumming is visually detectable only with appropriate magnification, for example, with a magnifying glass. However, scumming rarely occurs simultaneously across the entire width of the sheet and web, respectively. For this reason, visual inspection by means of a magnifying glass must extend across the entire width and therefore requires a considerable expenditure of time and concentration on the part of the printer. In addition thereto, a dampening-medium feed which is too high and which provides a high safety margin with respect to the scumming limit results in prints having reduced-contrast and being less sharp. In the interests of attaining good printing quality, therefore, efforts are made to print as closely as possible to the scumming limit.

In heretofore known methods and devices for monitoring and/or controlling the amount of dampening medium, the quantity of dampening medium in the ink or on the printing plate is determined in the printing unit by either direct or indirect measuring processes. The heretofore known processes have various disadvantages, however, and have, therefore, not proven themselves in practice. Thus, for example, the dampening-medium content in black printing ink is not measurable with infrared processes. Furthermore, dampening-medium measurements on the plate are greatly dependent upon the reflective behavior of the surface of the plate. The assignment of the measured values to the water-film thickness is, therefore, different from plate type to plate type and is additionally dependent upon the direction of rolling.

It is an object of the invention to provide a method of monitoring and/or controlling dampening-medium feed in an offset printing machine in which, uninfluenced by other parameters, a deficiency of dampening medium can be detected, displayed and/or corrected.

With the foregoing and other objects in view, there is provided, in accordance with one aspect of the invention, a method of monitoring dampening-medium feed in an offset printing machine, which comprises scanning non-printed areas in a region of given inked areas by means of an opto-electric transducer, and evaluating signals generated by the scanning.

In accordance with another mode of the inventive method, the scanned non-printed areas are located at rear edges of the inked areas, as viewed in a direction of printing.

It is also possible, however, within the scope of the invention, for other edge or marginal regions of inked areas to be scanned.

In accordance with a further mode of the method according to the invention, the given inked areas in which the scanned non-printed areas are located are measuring fields of a print-check or quality control strip. Each of the measuring fields represents an individual color or a printing unit, respectively. It is also possible, however, to use other suitable inked areas which may be located within the printed image.

In accordance with alternate modes of the inventive method, the inked areas are full-tone fields or half-tone fields with large area coverage, however, always only ink fields of one single color i.e. no superimposed printing of several colors.

In accordance with yet another mode of the method according to the invention which affords visual monitoring, the method includes representing the respectively scanned non-printed areas in an enlarged view on a viewing screen.

In accordance with yet a further mode of the inventive method, the method includes comparing the signals generated by the scanning of the non-printed areas with reference values and deriving from the comparison result a dampening-medium deficiency signal indicating too low a level of dampening-medium guidance or feed.

In accordance with yet an added mode of the method according to the invention, the method includes comparing the signals generated by the scanning of the non-printed areas with a reference value located between brightness of the respective non-printed area and brightness of the respective inked area, and calculating with respect to the respectively scanned area the area part of the signals deviating from the reference value.

In accordance with yet an additional mode of the method according to the invention, calculating the area part includes counting pixels for which corresponding signals deviate from the reference value.

In accordance with still another mode of the method according to the invention, the method includes producing a dampening-medium deficiency signal when the area part exceeds a given measure.

In accordance with other modes, the inventive method includes forming a mean value from the evaluating signals generated by the scanning of the non-printed areas, comparing the formed mean value with a reference value and deriving a dampening-medium deficiency signal therefrom if the formed mean value deviates from the reference value. Also the method includes representing the respectively scanned non-printed areas in an enlarged view on a viewing screen only when the dampening-medium deficiency signal is derived.

With this development of the method according to the invention, automatic monitoring and/or control of dampening-medium feed is also afforded.

Further in accordance with the method of the invention, the scanning may be performed on a printed sheet, preferably, however, it is also conceivable that the method according to the invention may include scanning areas on a rubber blanket or on a clamped printing plate.

In accordance with still a further mode, the method according to the invention includes controlling the dampening-medium feed in accordance with the evaluation signals generated by the scanning of the non-printed areas.

In accordance with another mode, the method according to the invention includes comparing the evaluated signals generated by the scanning of the non-printed areas with a reference value and forming a dampening-medium deficiency signal therefrom only if a respective evaluated signal deviates from the reference value, and increasing dampening-medium feed if a dampening-medium deficiency signal is formed, and stepwise reducing dampening-medium feed if no dampening-medium deficiency signal is formed.

In accordance with an added mode, the method includes additionally scanning the inked areas and generating corresponding signals, and deriving an excess dampening-medium signal from the signals generated by the scanning of the inked areas.

A further mode of the method invention includes feeding the signals generated by the scanning of the inked areas to an image-processing system. The resulting excess dampening-medium signal may be used together with the dampening-medium deficiency signal for controlling the dampening-medium feed.

In accordance with another aspect of the invention, there is provided a device for performing a method of monitoring dampening-medium feed in an offset printing machine, comprising opto-electric transducer means for scanning non-printed areas in a region of given inked areas, and means operatively connected therewith for evaluating signals generated by the transducer means in accordance with the scanning of the non-printed areas.

In accordance with an additional aspect of the invention, the transducer means comprise an opto-electric line sensor disposed in a measuring head, the measuring head being movable transversely to a printing direction in the printing machine.

In accordance with an added aspect of the invention, the transducer means comprise an opto-electric area sensor disposed in a measuring head, the measuring head being positionable in a respective area which is to be scanned.

In accordance with a further aspect of the invention, the transducer means comprise an opto-electric area sensor disposed in a measuring head, the measuring head being continuously movable transversely to a printing direction in the printing machine, and means for feeding the signals generated by the transducer means to the signal-evaluating means when the measuring head is directed towards the respective area to be scanned.

In accordance with again another aspect of the invention, the evaluating means comprise a comparator for comparing an actual value to a reference value.

In accordance with again an additional aspect of the invention, there are provided means for determining a position of an edge between the given inked areas and the non-printed areas from the signals generated by the transducer means in accordance with the scanning of the non-printed areas.

In accordance with a concomitant aspect of the invention, there is provided a device for performing a method of monitoring dampening-medium feed in an offset printing machine, comprising an elongated opto-electric line sensor disposed in a measuring head for scanning an area reproducible on the line sensor via an objective, the line sensor comprising a cylindrical lense having a curvature extending transversely to the longitudinal direction of the line sensor.

Other features which are considered as characteristic for the invention are set forth in the appended claims Although the invention is illustrated and described herein as embodied in a method of monitoring and/or controlling dampening-medium feed in an offset printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 7:
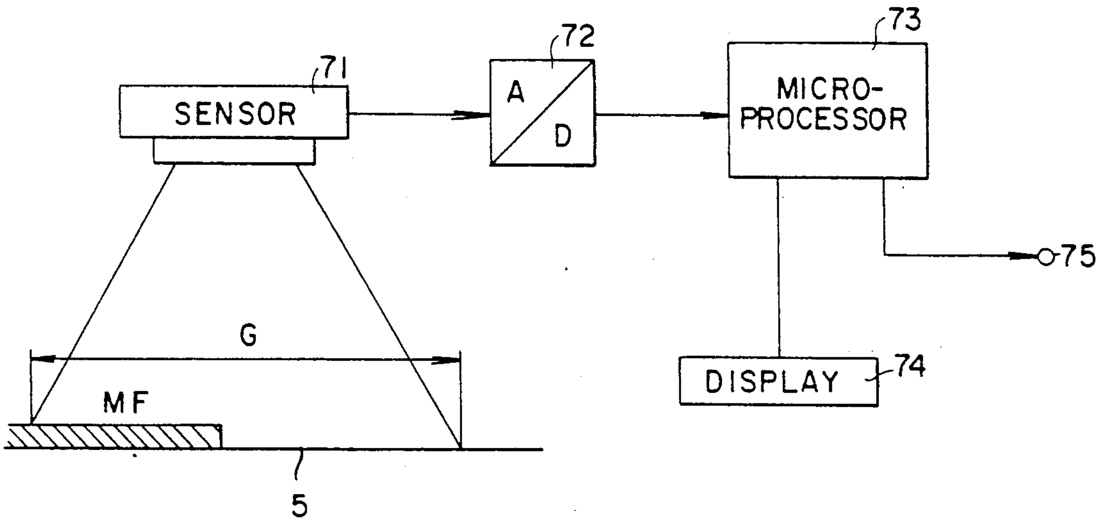
Figure 4:
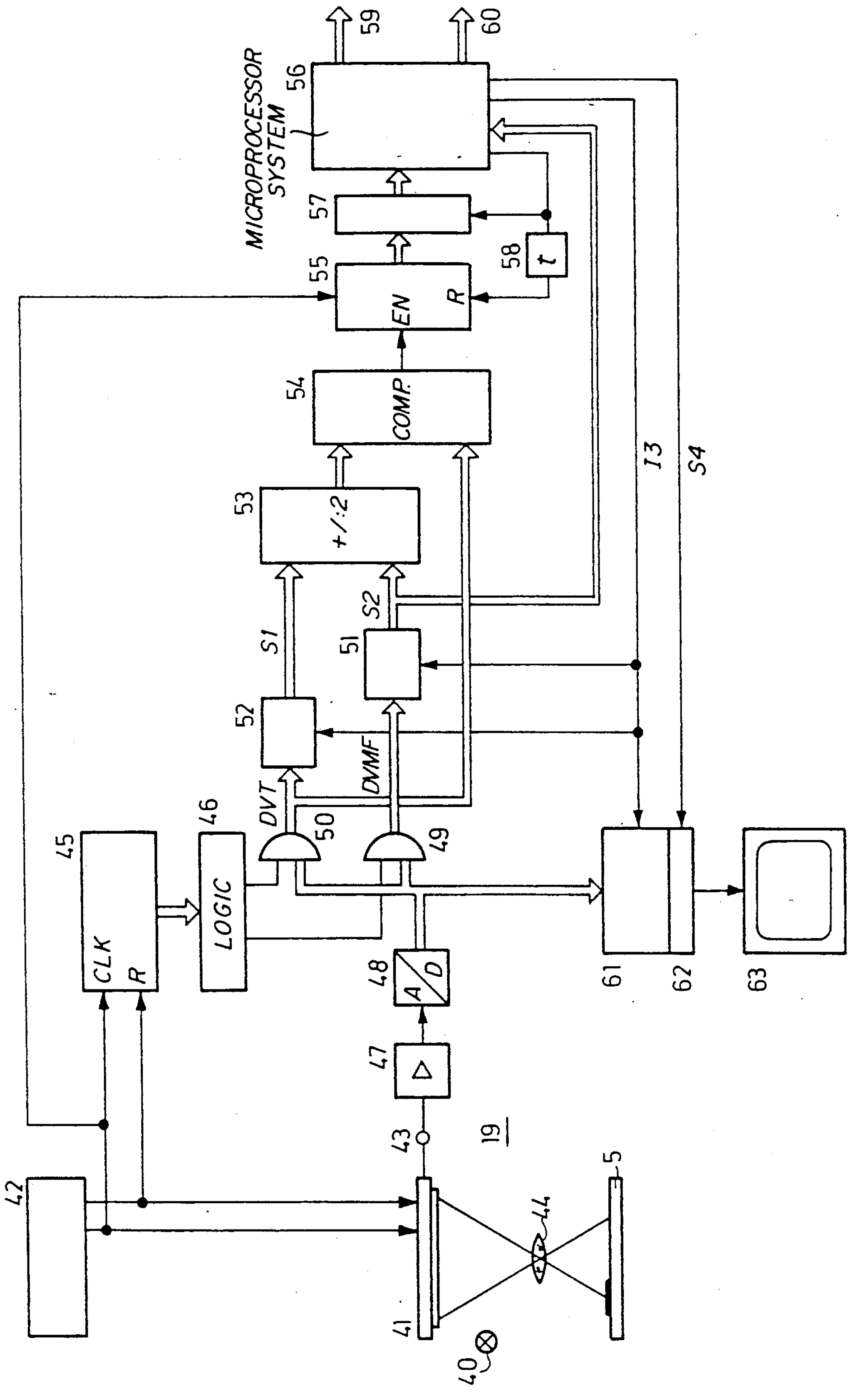
FIG. 4 is a block schematic diagram of a measuring head suitable for the method according to the invention as well as a circuit diagram for implementing the method according to the invention.
Figure 5A:
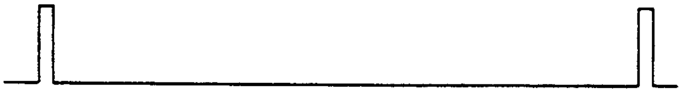
Figure 6:
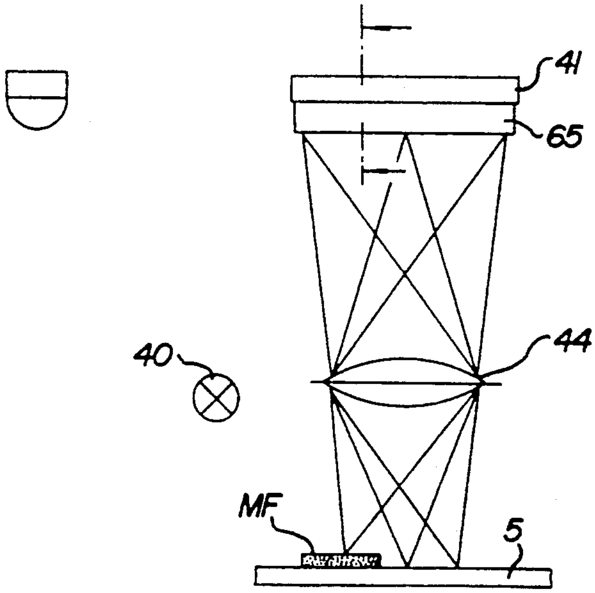

FIGS. 5*a*) to 5*e*) are timing diagrams of various signals occurring in the circuit arrangement shown in the diagram according to FIG. 4;

FIG. 6 is a diagrammatic view of an embodiment of part of a dampening-medium measuring head;

FIG. 7 is a block and circuit diagram of another system for implementing the method according to the invention.

Figure 8:
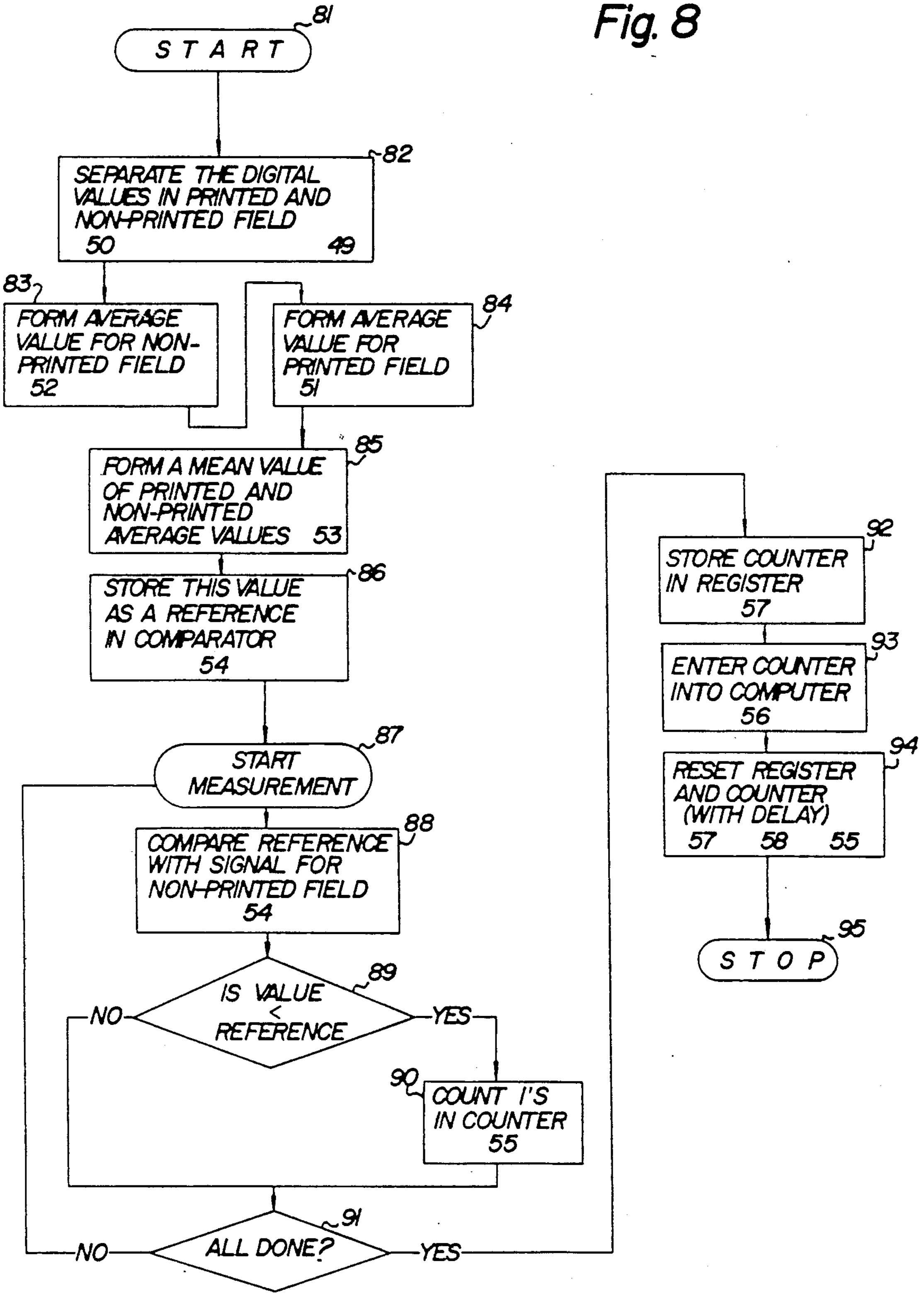
Figure 9:
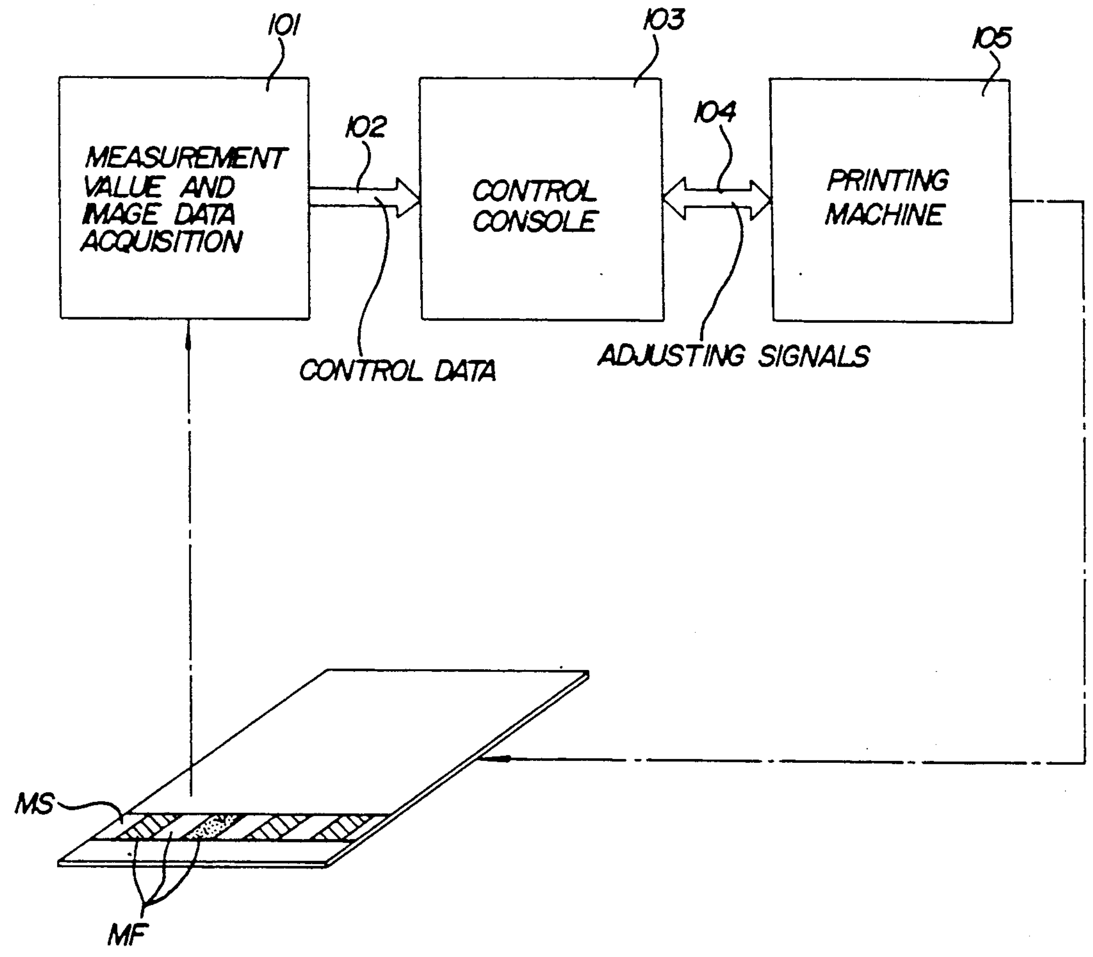
Figure 10:
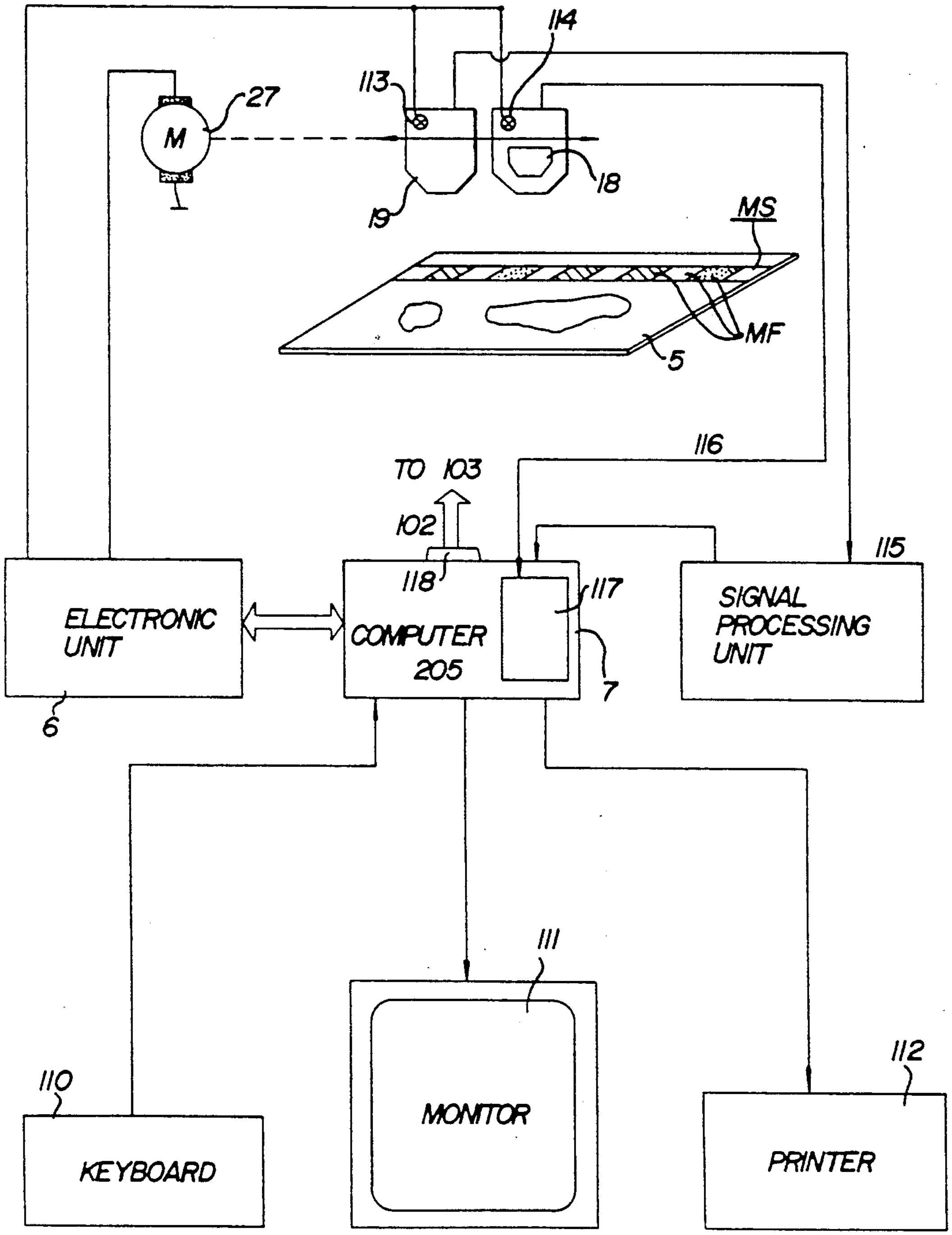
Figure 11A:
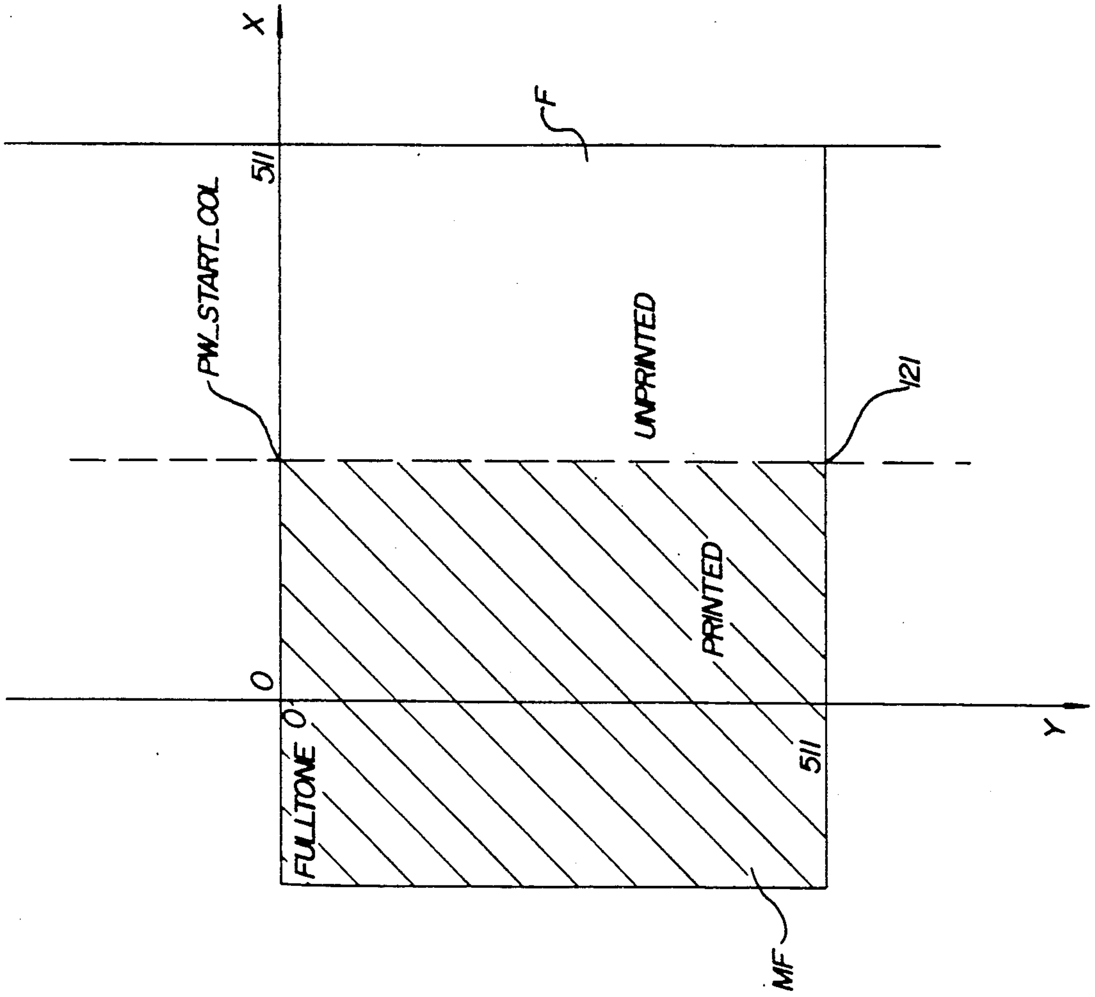
Figure 11B:
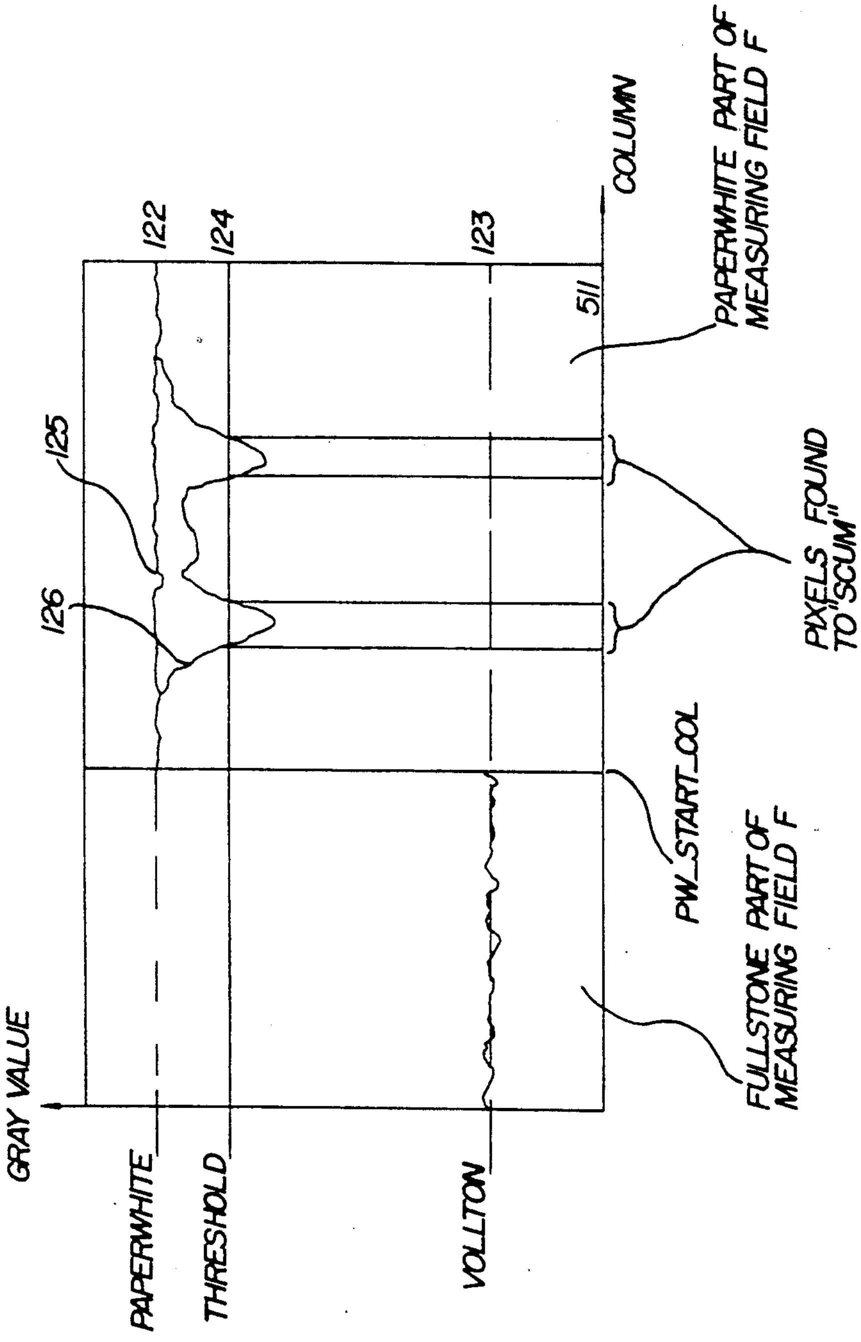

FIG. 8 is a flow diagram of a program for a microprocessor included in the circuit arrangement of FIG. 7;

FIG. 9 is a block diagram of a control circuit for performing the method according to the invention;

FIG. 10 is a device for determining measuring values and image data;

FIG. 11*a* is a diagrammatic view of an image taken by a video camera in the device according to FIG. 10;

FIG. 11*b* is a voltage-time rate of change diagram of a video signal corresponding to the image of FIG. 11*a;*

Figure 12:
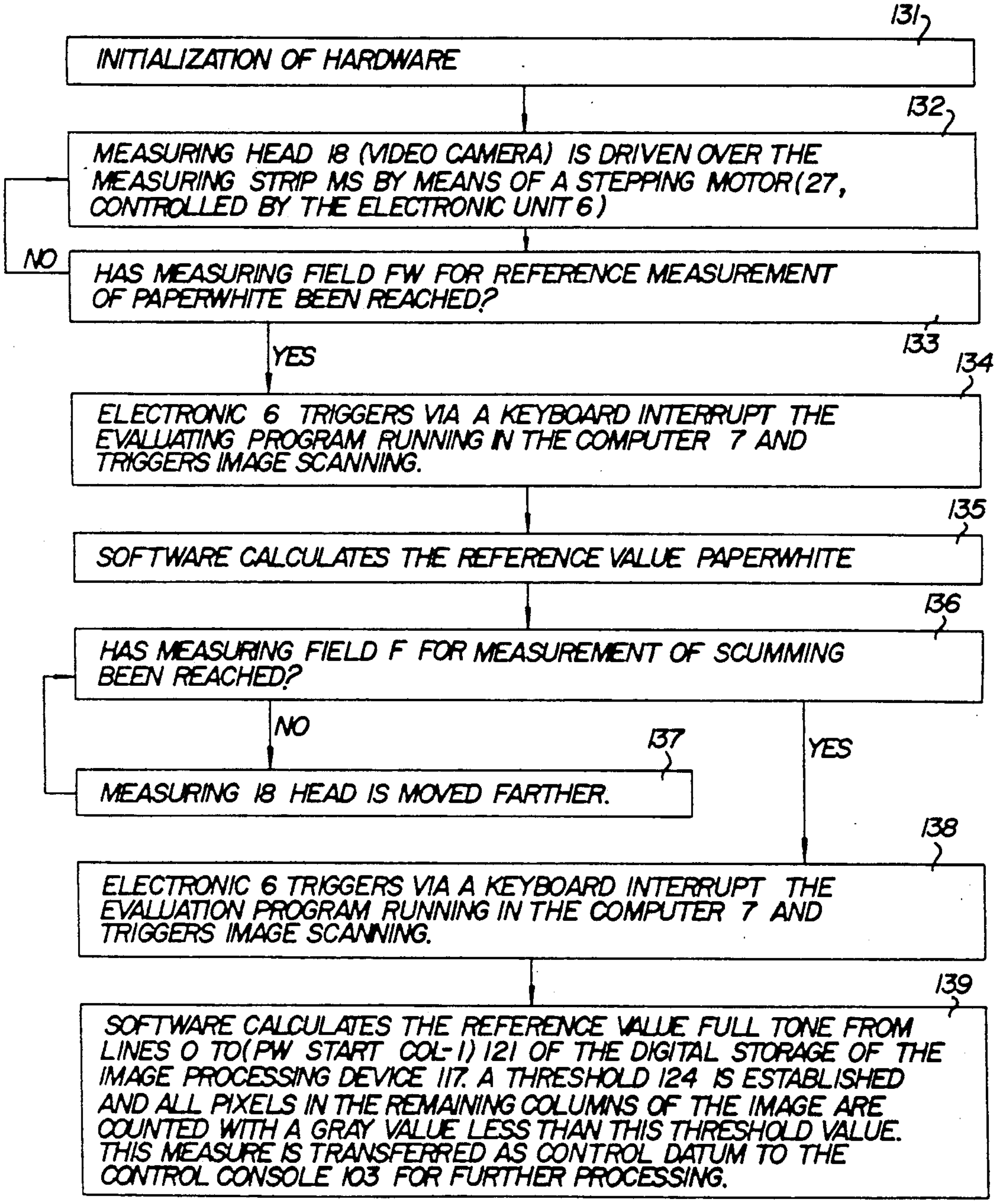
Figure 13:
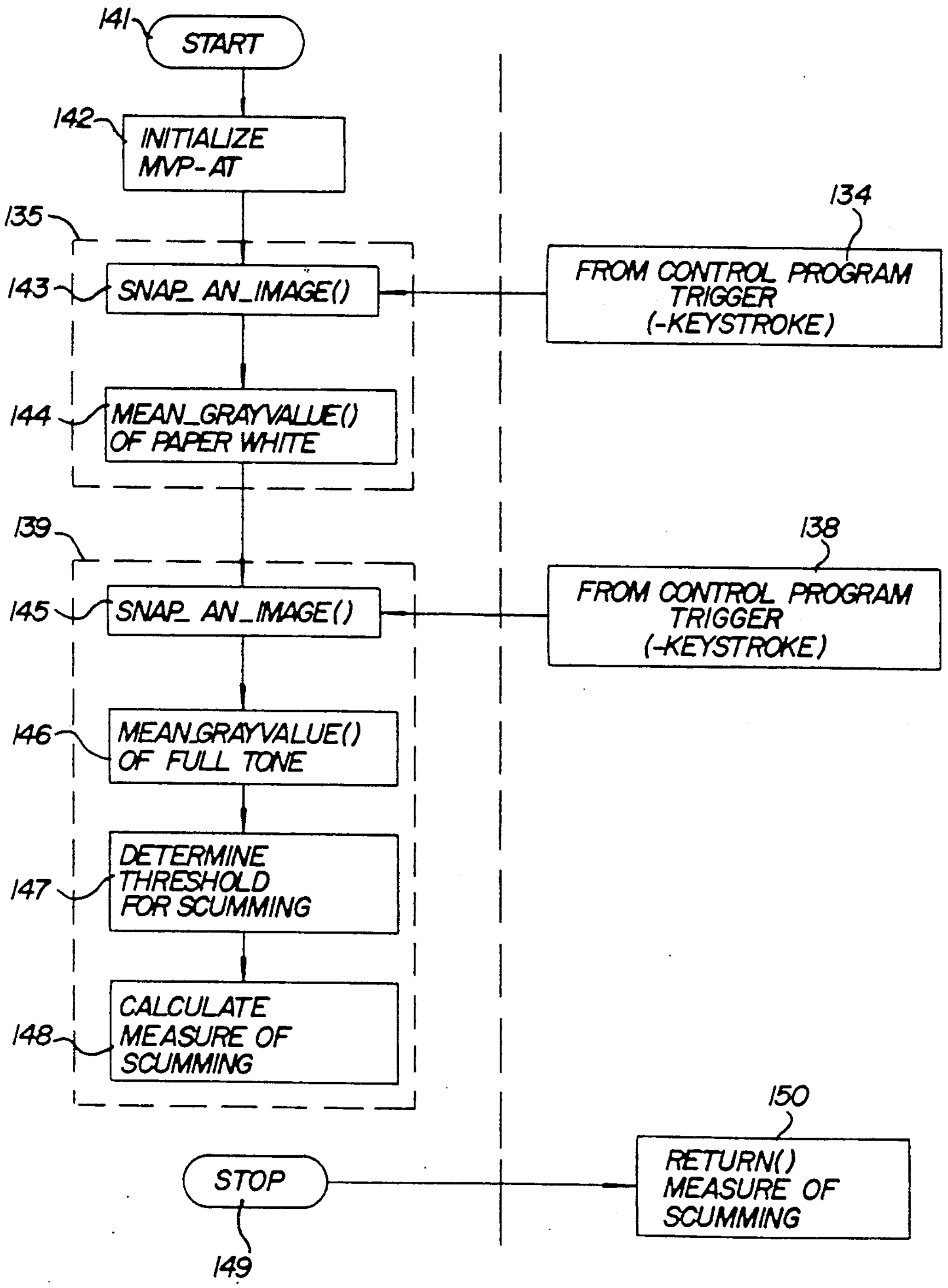

FIG. 12 is a plan of operation for a test run of the device according to FIG. 10; and FIG. 13 is a flow diagram of a program provided in the computer of the device according to FIG. 10.

Like parts in all of the figures are identified by the same reference characters.

Figure 1:
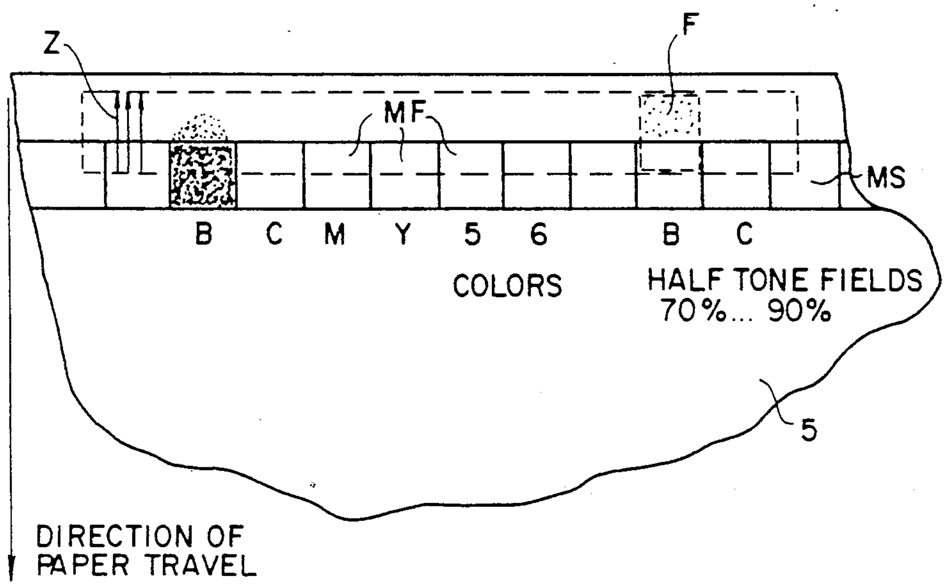
FIG. 1 is a top plan view of part of a printed sheet with a print-check or quality control strip.

Referring now to the drawing and, first, particularly to FIG. 1 thereof, a fragmentary view of a printed sheet 5 is presented containing a print quality control strip MS with several measuring fields MF. From the various measuring fields MF, there are shown in FIG. 1 full-tone fields of the colors B=black, C=cyan, M=magenta, Y=yellow as well as of a fifth and sixth color. Fields of the colors B and C are shown by way of example as half-tone fields with an ink coverage of 70% to 90%. Because scumming starts initially, for example, in the black behind the full tone field B at the beginning of a deficiency of dampening medium, greater scumming occurs in the illustrated example, whereas scumming is less pronounced in the half-tone field B.

In the method according to the invention, the area indicated by the broken lines in FIG. 1 is scanned. Scanning is performed line by line, with the lines lying parallel to the printing direction, a sensor 41 (FIG. 4) described in greater detail in connection with FIG. 4, being used for scanning in this direction. For the sake of clarity, FIG. 1 shows only a few lines Z. The scanning transversely to the printing direction is performed preferably with a conventional device, which is shown in FIGS. 2 and 3.

Instead of a line sensor, it is also possible to use an area sensor, which, for example, in a respective position, scans an area F, which is assigned to a respective measuring area.

Figure 2:
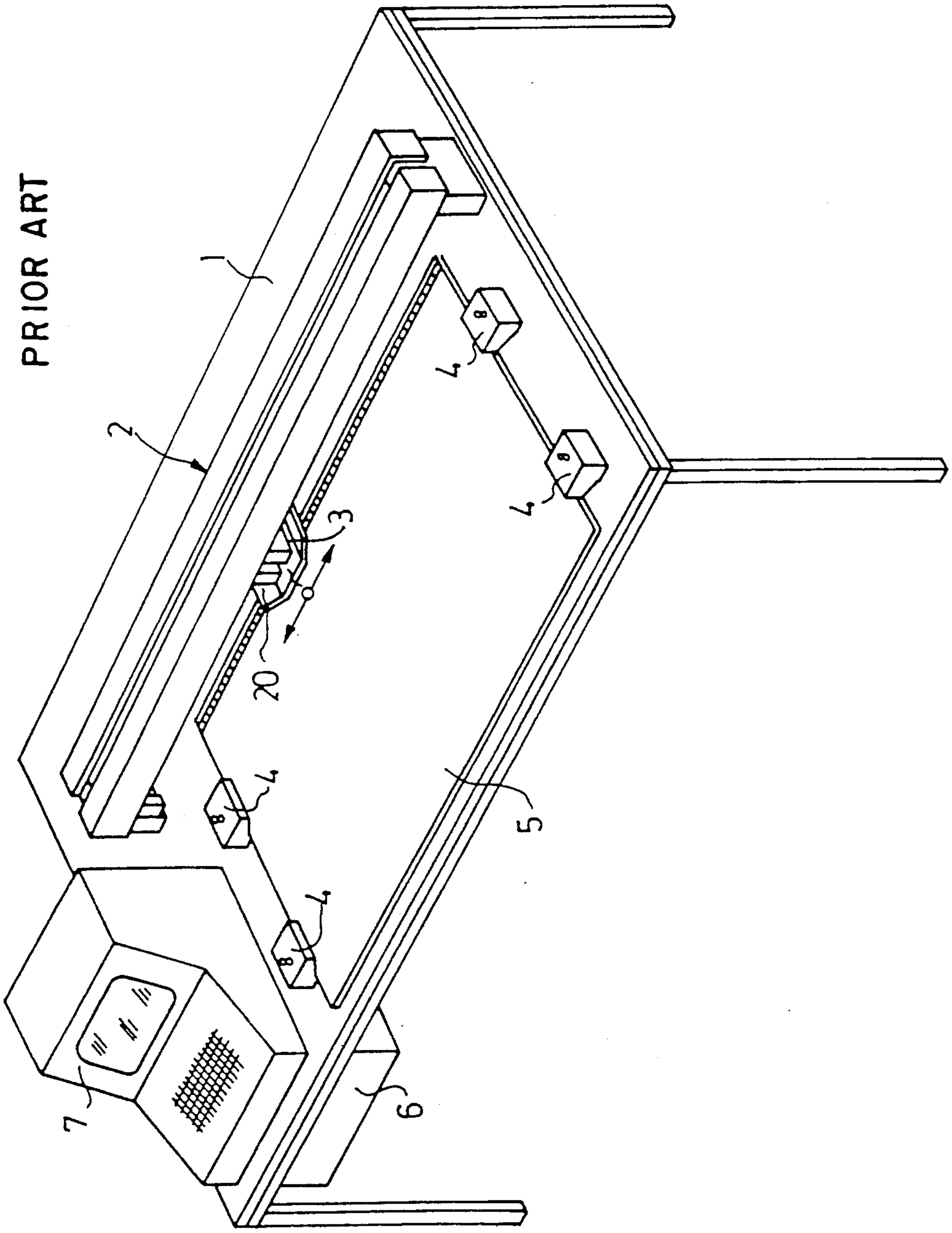
Fig.2 PRIOR ART
FIGS. 2 and 3 are perspective views of devices known in the prior art for evaluating a printed ink-measuring or quality control strip with an additionally integrated dampening medium-measuring head.
Figure 3:
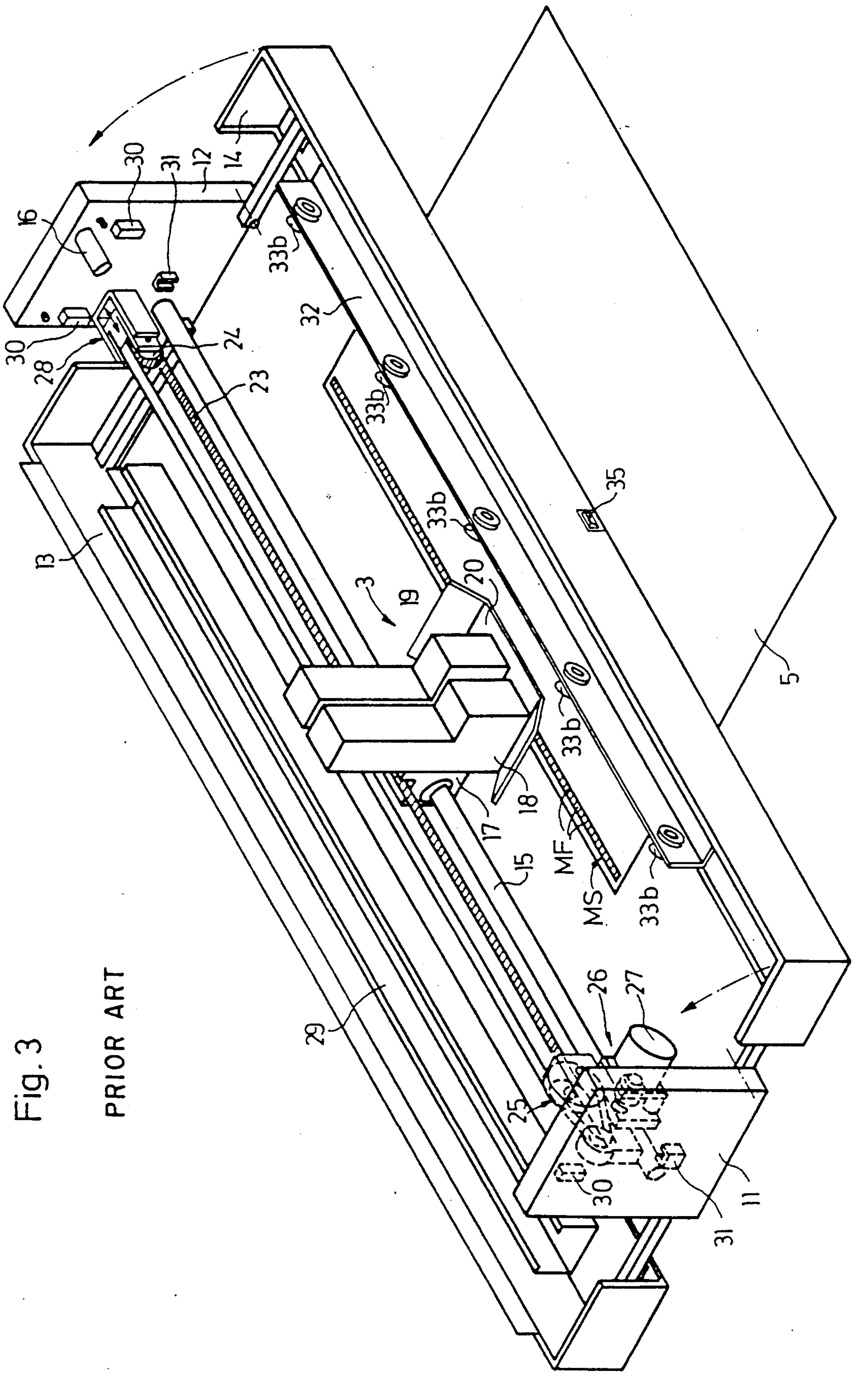
Fig. 3 PRIOR ART

The device illustrated in FIG. 2 includes a measuring table 1 and, thereon, a measuring bridge 2 with a measuring carriage 3, four clamping blocks 4 for securing a printed sheet 5 to be measured, an electronics unit 6 and a personal computer 7. Beneath an uppermost surface layer at the top of the table is a layer of sheet steel, which permits the printed sheet 5 to be secured by means of magnets or the like. The personal computer 7 which has an integrated screen terminal is rotatably mounted on the table 1. The measuring carriage 3, the electronics unit 6 and the personal computer 7 are connected by non-illustrated leads.

The electronics unit 6 includes a microprocessor system and interfaces for processing measuring and control signals fed thereto and generated thereby. The microprocessor system in the electronics unit 6 cooperates with the personal computer 7 in a so-called master-slave mode, the personal computer performing a control or monitoring function and evaluating the measured and inputted data, while the system in the electronics unit is responsible for performing the measurements and the movements of the measuring carriage.

The measuring strip i.e the sequence of measuring-field types, colors, area coverages and the like, as well as the distances therebetween, is known to the system by means of a once-only input. Consequently, measured values need be transferred to the system only at given positions.

FIG. 3 provides an enlarged view of the measuring bridge 2. The latter is formed with two vertical side parts 11 and 12, which support the remaining parts of the bridge, as well as two outer casings or hoodlike covers 13 and 14, which extend over the space between the two side parts 11 and 12 and are swivel-mounted on the latter so that they may be hinged apart or flapped out into the positions thereof shown in FIG. 3, thereby providing access to the inner parts of the measuring bridge. The two side parts 11 and 12 are connected to each other by a guide shaft 15 and a connecting rod 16 shown only in part.

The measuring carriage, identified as a whole by reference numeral 3, is reciprocatingly movable on and may also be swivelled about the guide shaft 15. The measuring carriage 3 is formed of a guide block 17 provided with two ball boxes, two measuring heads 18 and 19 fixed to the guide block 17, as well as a guide or hold-down plate 20, upwardly angled at both sides thereof. The measuring carriage 3 is provided with non-illustrated rollers at the underside thereof. During operation, the measuring carriage 3 rests on the printed sheet 5 which is to be measured, with the result that the distance between the measuring heads 18 and 19 and the individual fields MF of the measuring or quality control strips MS on the printed sheet 5 is always constant. The measuring head 19 is basically of the type described in U.S. Pat. No. 4,078.858 and measures three color channels simultaneously. The measuring head 18 serves for performing the method according to the invention and is described in greater detail with reference to FIG. 4.

The measuring carriage 3 is driven by a toothed belt 23, which is passed over two rollers 24 and 25, each rotatably supported on one of the side parts 11 and 12, and has a lower or return run to which the guide block 17 is fixed. The roller 25 on the left-hand side of FIG. 3 is driven by a stepping motor 27 via a toothed-belt reduction-gear or step-down transmission unit 26 shown only in broken lines. The other roller 24 is supported in a freely rotatable manner in a clamping device 28. The stepping motor 27 and the transmission unit 26 are constructed so that the toothed belt 23 and the measuring carriage 3 therewith are moved forward at a rate of 0.1 mm per complete motor step.

A guide section 29 is disposed in the rear outer casing or hood 13 and has a flat conductor running therethrough which electrically connects the measuring carriage 3 to the electronics unit 6. Further disposed at the side parts 11 and 12 are quick-release locks (indicated by blocks 30) for fixing the two outer casings or hoods 13 and 14 in their hinged-up or flapped-together closed positions, as well as a fork-type light barrier 31, which cooperates with a non-illustrated sheet-metal strip or the like on the guide block 17 and the measuring carriage 3, respectively, in such a manner that the measuring carriage 3 is automatically halted if it comes within a defined minimum distance from one or the other of the side parts e.g. due to a control error.

Fixed in the front outer casing or hood 14 is a holder 32 having an U-shaped cross section in which are disposed five marking lamps which are evenly distributed along the length of the measuring bridge 2. These lamps are respectively formed of a light source in the form of a so-called graduated lamp (not visible in FIG. 3) in an upper leg of the holder 32 and of a projection lens system 33 in a lower leg of the holder 32, and form on the printed sheet 5 five bars of marking light, approximately 20 mm in length, respectively, and arranged in a line. The bars of light serve for the alignment of the printed sheet 5 in such a manner that the measuring or quality control strip MS is caused to lie precisely below the travel path of the two measuring heads 18 and 19. On the upper side of the front casing or hood 14, there is also provided an operating rocker or control bell crank 35 by means of which the measuring carriage 3 may be moved under manual control along the measuring or quality control strip MS into the desired measuring position.

In the embodiment of the invention shown in FIG. 4, scanning is performed with a charge-coupled line sensor (CCD line) 41. As mentioned hereinbefore, it is also possible to use area sensors, i.e. video cameras with pickup tubes or semiconductor pickup elements.

Line sensors are obtainable in different versions and encompass, for example, 1,024 light-sensitive elements having charges dependent upon the respective exposure which are transmitted to an output register by the application of a pulse H (FIG. 5*a*), and are then read out serially from the output register by clock pulses T. The pulses T and H are derived in a clock generator 42. A video signal V representing the brightness distribution on the line sensor is then available at the output 43.

With the aid of an objective 44, a respective line of the area to be scanned on the printed sheet 5 is imaged or reproduced on the line sensor 41. This imaging includes part of the measuring area as well as part of the non-printed portion of the printed sheet 5 lying behind the measuring area MF. An illumination device 40 provides adequate lighting.

Figure 5B:
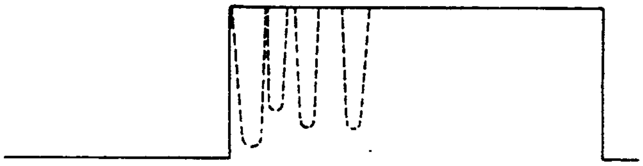

FIG. 5*b*) shows an example of a video signal which is present at the output 43, the solid-line curve of FIG. 5*b*) corresponding to a line in which no scumming is detectable. Incipient scumming, such as in the half-tone measuring field B (FIG. 1), causes dips in the video signal, as is represented by the broken lines in FIG. 5*b*) Between the instants of time t0 and t1, the video signal represents the measuring area and between the instants of time t1 and t2, the video signal represents the adjacent non-printed area.

The evaluation of the video signal may be effected in various ways A simple visual evaluation may be performed by the enlarged representation of the video signal on a monitor 62. Basically, various methods are available for metrological evaluation of video signals A particularly simple method is, for example, to supply the relevant time section of the video signal via a gate circuit to a threshold-value circuit and, if the threshold value is not attained, to emit a suitable signal Evaluation may, however, also be performed by complex methods, it being possible to use analog and digital circuits as well as computer systems. In the device shown in FIG. 4, the processing steps leading to a multi-digit digital signal dependent upon the degree of scumming are performed with digital circuits. A microprocessor system 56 is provided for further processing and for higher-ranking controlling of the measuring process.

Figure 5C:
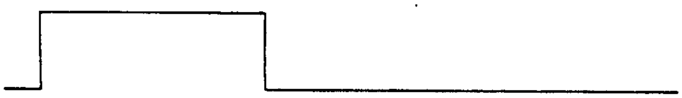
Figure 5D:
Figure 5E:

Because each line covers a period of time t0 to t1, during which the measuring field is scanned, and another period of time t1 to t2, which corresponds to the scanning of the non-printed area behind the measuring field, the pulses I1 and I2 shown in FIG. 5*c*) and 5*d*) are generated in order to separate these signal components. For this purpose, the clock pulse is supplied by the clock generator 42 to a counter 45, which is reset by the pulse H at the beginning of each line The pulses I1 and I2 are derived from the count in a logic circuit 46 by an appropriate combination of the individual digits of the counter.

From the output 43 of the line sensor 41, the video signal V passes via an amplifier 47 to the input of an analog/digital converter 48. The video signal is available at the output of the analog/digital converter 48 in the form, for example, of an 8-bit wide digital signal DV and can, therefore, be further processed in the following by digital circuits. An AND circuit 49 passes on the video signal DVMF obtained by the partial scanning of the measuring field MF, while the AND circuit 50 passes on that part DVT of the video signal which represents the non-printed part of the printed sheet.

In the following circuits 51, 52, the digital video signals DVMF and DVT are respectively averaged with respect to time over the first lines produced in the scanning of a respective measuring field MF (signals S1 and S2). Then, the two averages are, in turn, averaged in a circuit 53, to form, for example, an arithmetic mean. Thus, a threshold value S3 has been derived, which is represented as the dot-dash line in FIG. 5*b*). This threshold value thus adapts to the brightness of the measuring field MF and to the brightness of the non-printed part of the printed sheet 5. The signal S1, which corresponds to the mean brightness of the non-printed sheet, may be derived in an adjacent non-printed area of the sheet where there is certain to be no scumming, and can be stored until the scanning of the non-printed area, which, however, may possibly be affected by scumming.

The threshold value S3 and the digital video signal DVT, as well, are fed to a comparator, the output signal of which is dependent upon whether the video signal does not attain or remains under the threshold value S3 within the second period of time t1 to t2. This signal, as shown in FIG. 5*a*), could in fact be used already as a dampening-medium deficiency signal with, however, even the smallest errors in the printed material triggering a false alarm. In the circuit according to FIG. 4, therefore, it is provided that the output signal of the comparator 54 respectively enables and disables a counter 55. The clock pulses T are fed to a clock input CLK of the counter After the scanning of each measuring field MF and of the non-printed area situated behind it, the contents of the counter 55 are loaded into a register 57 and, shortly thereafter, the counter 55 is reset. For this purpose, the microprocessor system 56 feeds a load pulse to the register 57 and, via a time-delay circuit 58, to a reset input of the counter 55.

The counting of clock pulses over the period of time during which the video signal V or DV falls short of the threshold 53 provides a measure of the area affected by scumming. This measure may be evaluated in the microprocessor system 56 in accordance with practical requirements. Thus, for example, in the case of very small area coverage, it may be decided that there is no scumming yet, and the area extending beyond it may be used as a measure of the degree of scumming. According to this information, further units, such as a digital display device or adjustment members for the quantity of dampening medium may be actuated via outputs 59, 60 of the microprocessor system 56.

During the scanning of a respective measuring field MF and of the non-printed area behind it, the digital video signals are written to a memory 61. If scumming occurs in this measuring field, the microprocessor system 56, by means of a signal S4, activates a read-out part 62 of the memory 61, which reads out the stored signals from the memory 61 and feeds them to a monitor 63. The read-out process occurs repeatedly in order to obtain a continuous display. The monitor 63, therefore, displays the measuring area and the associated part of the non-printed area only if there is scumming. In this connection, the threshold for display on the monitor may be set relatively low sc that, even in the case of incipient scumming, the printer is able to judge whether action should be taken During the remainder of the time, the printer is not distracted by displays on the monitor 63.

For automatically controlling dampening-medium distribution or feed, the microprocessor system 56 may contain a suitable program, which supplies more dampening medium if scumming should occur. Depending upon the mode of the method according to the invention, there may be a once-only increase in the dampening-medium feed depending upon the extent to which scumming occurs (output of the counter 55) It is possible, however, after such an increase, for there also to be a gradual, step-by-step reduction until scumming occurs again. The quality of the printed product is virtually unaffected by this "exploratory" exceeding or surpassing of the scumming limit, because the method according to the invention detects even the slightest scumming, especially if the scanning occurs at a location which is particularly critical with regard to scumming (solid black or full-tone area).

According to a further development of the method according to the invention, in order also to be able to detect an excess of dampening medium, the signal S2, which represents the mean brightness of the scanned part of a measuring field, is fed to the microprocessor system. This is because coverage, particularly of full-tone fields, deteriorates if there is an excess of dampening medium. If the nominal or setpoint value for a measuring field has been stored in the microprocessor system, it is possible to conclude from the deviation in the brightness of a full-tone field that there is an excess of dampening medium. The result can be incorporated into the automatic dampening-medium control system.

In order to detect an excess of dampening medium, it is also possible to use an image-processing system. The coverage, particularly of full-tone fields, deteriorates noticeably if there is too much dampening medium. Through a comparison with a perfect image and its area coverage, respectively, (one-hundred percent coverage is not possible because of the surface roughness of the stock), an image-processing system is able to detect and to display deviations and/or to derive control signals in accordance with stored algorithms. Because clear underinking can also cause a deterioration in coverage, there is initially determined through a comparison of the measured values for the inking of various or of all of the zones whether there is underinking or an excess of dampening medium. An excess of dampening medium occurs initially in inking zones with low inking because the feeding of dampening medium is not controlled zonally. A measure of the zonal area coverage and thus of the level of inking is the inking zone opening, the size or value of which is known to the computer of the inking-control device This value is used in the logic connections or linkages. If, for example, the full tones of zones with a small inking-zone opening are poorly covered and less inked than the full tones of zones with a larger opening, then there is in this case an excess of dampening medium.

At a respective transition between pairs of measuring fields, the microprocessor system 56, which also controls the movement of the measuring head 19 in a non-illustrated manner feeds a pulse I3 to the circuits 51, 52 and to the memory 61.

FIG. 6 diagrammatically illustrates a measuring bed with a line sensor 41 onto which the original 5 which is to be scanned is imaged or reproduced with the aid of an objective 44. In addition, an illumination device 40 is provided In order to obtain averaging transversely to the direction of the line sensor 41, the latter is provided with a cylindrical lens 65. Thus, subsequent electrical integration transversely to the line direction can be omitted.

Whereas, in the circuit arrangement according to FIG. 4, the video signal is evaluated with a specially constructed circuit, and the size of the area affected by scumming is passed on to a microprocessor system, in the circuit arrangement according to FIG. 7, the entire evaluation is performed by a microprocessor 73.

The scanning of an edge of a full-tone area MF over a measuring area G is effected with the aid of a sensor 71. The signal produced by the sensor 71 is fed via an analog/digital converter 72 to an input of the microprocessor 73, which is connected to a display apparatus 74 and, in addition, can be connected via an output 75 to adjustment members or actuators for controlling the feed of dampening medium in a printing machine.

The microprocessor evaluates the digital video signals by means of a suitable program. FIG. 8 shows a flow chart for such a program, steps being provided in the signal evaluation process similar to the ones in the circuit arrangement of FIG. 4. Accordingly, the reference characters from the circuit arrangement of FIG. 4 have been added in the illustration of the individual parts of the program as much as possible.

The program represented in FIG. 8 is started at 81. In a program part 82, the digital values are separated according to the position of the individual pixels on the printed area MF or on the non-printed area. At 83 and 84, respectively, the mean values are formed for the non-printed and the printed fields. From this, in program part 85, another mean value is calculated. In 86, this mean value is stored as a reference. Thereafter, the start of the actual measurement occurs at 87 by reading-in a value which was derived from the scanning of the non-printed field. At 88, this value is compared with the stored reference. If the value is less than the reference, a counter is incremented at 90 after a branching at 89.

If the value is larger than the reference, however, the counter is not incremented. At the step 91, the decision is made whether or not the values of all the pixels of a non-printed field respectively have been processed. As long as this is not the case i.e. is "FALSE", the program is looped or repeated from 87 to 91. If all of the values have been processed, the program continues at 92 by storing the value from the counter in a register. Then the counter value is outputted out via the output 75, which is connected to the input of a superordinate computer, for example the computer 205 in FIG. 10. In a program part 94, the counter is reset and the program is ended at 95 and, if necessary, repeated with another measurement field.

As explained hereinbefore in connection with FIG. 4, the counter value outputted in the program part 93 is a measure for the amount of scumming.

In the control circuit illustrated diagrammatically and schematically in FIG. 9, the measurement fields MF and the adjacent non-printed fields of a printed sheet 5 are scanned in accordance with FIG. 1 by a device 101 for measurement value and image data acquisition or collection. After the resulting image data are fed to a control console 103 via a data bus 102, they are displayed and, if necessary or desirable, varied by the operator and converted to control signals.

A printing machine 105 is connected to the control console 103 via a further bus 104. The control signals necessary for adjusting the machine 105 can be transmitted via the bus 104 from the control console 103 to the printing machine 105. The bus 104 further serves to transmit various data from the printing machine 105 to the control console 103. The printed sheet 5 is printed in the printing machine 105 in accordance with the control signals which are fed in.

FIG. 10 shows a block circuit diagram of the measurement value and picture data acquisition device 101 (FIG. 9). The mechanical construction of such a device has already been explained in connection with FIGS. 2 and 3. As further explained in connection with FIG. 2, the computer 7, which is preferably a PC personal computer, controls the entire sequence of measurement and measurement value acquisition.

n this regard, the PC 7 is connected to a keyboard 110, a monitor 111 and a printer 112. An output of the PC 7 is further connected to the electronic unit 6, which controls the stepping motor 27 and which feeds the lamps 113 and 114 which are disposed in the respective measuring heads 18 and 19. The measuring head 19 is basically of the type described in U.S. Pat. No. 4,078,858, simultaneously measuring three ink channels. Its output signals are processed in a conventional signal processing unit 115 and fed to the PC 7.

The measuring head 18 is a video camera having output signals which are fed to an image processing unit 117 via a line 116. The image processing unit 117 is commercially available as auxiliary equipment for PCs. A widely available device of this kind is the MVP-AT (MATROX Vision Processor), manufactured by Matrox Electronics Systems Ltd., Canada; this system is formed of two cards which are inserted into free expansion slots of the personal computer. Another image processing device is made by the firm Data Translations, Inc., Marlboro, Massachusetts, under the designation DT 2853. These devices can be programmed in multiple ways With a suitable program, they are able to perform image processing necessary for performing the method in accordance with the invention.

Control data can be fed to the control console 103 (FIG. 9) via an interface 118 of the PC and via the bus 102. The image processing device 117, among other things, can store images. The contents of this image storage, and values determined therefrom, can be displayed on the monitor 111. Data and commands can be inputted by means of a keyboard 110, while the printer 112 prints out data for documentation purposes.

The electronic unit 6 cooperates with the PC in the so-called master-slave mode of operation. The PC receives a signal dependent upon the position of the measuring head 18 above the measuring strip MS. This signal serves as a trigger in the image processing device 117 for scanning an image. FIG. 11 shows the position of the field F (FIG. 1) within the image memory of the image processing device 117. The image memory is organized into a two-dimensional matrix of 512 lines and 512 columns, so that an image formed of 262,144 pixels can be stored.

The measuring strip MS is oriented so that the edge between the full tone part of the measuring field MF and the non-printed area comes to lie in either a predetermined position 120 (column of the image storage) or in an interactively determined position, denoted by PW-START, which is keyed in by the operator via the keyboard 110 (FIG. 10).

FIG. 11*b* shows the gray-value curve along a line in the digital storage of the image processing device 117 in the ideal case i.e. without scumming (125) and with a moisture deficiency (126). The gray value of the paper white is shown as 122 and the gray value of the full tone ink as 123. The threshold value, for the purpose of differentiating whether there is ink on a non-printed pixel, lies below the paper white at 124. In the case of scumming, the curve 126 of the gray value dips with respect to the curve 125; these dips go below the threshold value. The number of pixels for which this situation applies is a measure for the degree of scumming.

FIG. 12 illustrates an operation plan or chart of the measuring run of the device according to FIG. 10. The individual steps 131 to 139 of the measuring run are explained in FIG. 12, so that further comments are not necessary. A program corresponding to this operation chart is stored in the personal computer 7. The program steps 135 and 139 serve, however, for processing the signals of the video camera and are components of a program specifically provided for the image processing device 117. This program is illustrated in FIG. 13 in the form of a flow chart. In the following description, the program running the measuring process is called the control program, while the program in accordance with FIG. 13 is called the image processing program.

After starting at 141, the image processing program initializes the image processing device MVP-AT in a program part 142. Then the image processing program waits until it is triggered by the control program in 143 to snap or shoot a picture or image at 144. The image taken is of the field FW (FIG. 1), which is not printed. In the subsequent program part 145, the mean gray value for paper white is determined therefrom and stored. The further course of the image processing program is again started by the control program (139) when the measuring head 18 has reached the position above the measuring field F (FIG. 1).

After the picture or image has been taken (program part 145), the mean gray value of the full tone field is calculated at 146 and the threshold value 124 (FIG. 11*b*) is determined at 147. Thereafter, for each pixel, there is determined at 148 whether, within the non-printed part of the field F, the gray value 126 remains below the threshold value 124. The sum of these pixels then is the measure of the scumming The image processing program ends at 149, and returns to the control program at 150, and the measure for the scumming is outputted.

Attached hereinafter are listings of a program written in C language in accordance with the flow chart of FIG. 13, and not explained in any further detail. They show a possible way of programming the image processing device MVP-AT for performing the method in accordance with the invention.

What is claimed is:

1. Method of monitoring and/or controlling dampening-medium feed in an offset printing machine, which comprises scanning inked and ink-free areas of a printed image by means of an opto-electric transducer and generating corresponding signals of respective values, feeding the signals to a microprocessor and comparing the respective values thereof with corresponding reference values, increasing dampening-medium feed when the scanning-signal values of the ink-free areas deviate from the reference values thereof, and storing a signal for reducing the dampening-medium feed when the scanning-signal values of the inked areas deviate from the reference values thereof.

2. Method according to claim 1, wherein includes stepwise increasing and decreasing, respectively, the dampening-medium feed when the scanning-signal values for the inked area deviate from the reference values thereof until the scanning-signal values again match the respective reference values therefor.

3. Method according to claim 1, wherein the given inked areas in which the scanned non-printed areas are located are measuring fields of a print quality control strip.

4. Method according to claim 1, wherein the given inked areas in which the scanned non-printed areas are located are full-tone fields.

5. Method according to claim 1, wherein the given inked areas in which the scanned non-printed areas are located are half-tone fields with a large area coverage part.

6. Method according to claim 1 wherein the scanned areas are within a printed image.

7. Method according to claim 1, which includes representing the respectively scanned ink-free areas in an enlarged view on a viewing screen.

8. Method according to claim 1, which includes determining an ink-covered area part of the ink-free areas and an ink-free area part of the inked areas, respectively, when the scanning signal values for the ink-free areas and for the inked areas, respectively, deviate from corresponding reference values thereof, and respectively increasing and decreasing dampening-medium feed in accordance with the determined area parts.

9. Method according to claim 1 which includes comparing the signals generated by the scanning of the non-printed areas with a reference value located between brightness of the respective non-printed area and brightness of the respective inked area, and calculating with respect to the respectively scanned area the area part of the signals deviating from the reference value.

10. Method according to claim 9, wherein calculating the area part includes counting pixels for which corresponding signals deviate from the reference value.

11. Method according to claim 9, which includes producing a dampening-medium deficiency signal when the area part exceeds a given measure.

12. Method according to claim 1 which includes forming a mean value from the evaluating signals generated by the scanning of the non-printed areas, comparing the formed mean value with a reference value and deriving a dampening-medium deficiency signal therefrom if the formed mean value deviates from the reference value.

13. Method according to claim 12, which includes representing the respectively scanned ink-free areas in an enlarged view on a viewing screen only when the dampening-medium deficiency signal is derived.

14. Method according to claim 1, which includes performing the scanning of the areas on a printed sheet in-linear off-line.

15. Method according to claim 1, which includes performing the scanning of the ink-free areas on a printed sheet on an impression cylinder.

16. Method according to claim 1, wherein the printing machine has a plurality of printing units, and which includes performing the scanning of the ink-free areas in a last printing unit as viewed in direction of printing.

17. Method according to claim 1, wherein the printing machine is a sheet-fed first-form and perfector printing machine having a plurality of printing units, and which includes performing the scanning of the ink-free areas in a last printing unit before turning a sheet to be perfected.

18. Method according to claim 1, which includes performing the scanning of the ink-free areas within the printing machine.

19. Method according to claim 18, which includes performing the scanning on a rubber blanket in the printing machine.

20. Method according to claim 18, which includes performing the scanning on a clamped printing plate in the printing machine.

21. Method according to claim 1, which includes controlling the dampening-medium feed in accordance with the evaluation signals generated by the scanning of the ink-free areas.

22. Method according to claim 1, which includes comparing the evaluated signals generated by the scanning of the ink-free areas with a reference value and forming a dampening-medium deficiency signal therefrom only if a respective evaluated signal deviates from the reference value, and increasing dampening-medium feed if a dampening-medium deficiency signal is formed, and stepwise reducing dampening-medium feed if no dampening-medium deficiency signal is formed.

23. Method according to claim 3, which includes determining the area parts by counting area elements at which the values of scanning signals associated with the area elements deviate from the corresponding reference values.

24. Method according to claim 1, which includes feeding the signals generated by the scanning of the areas to an image-processing system.

25. Device for performing a method of monitoring and/or controlling dampening-medium feed in an offset printing machine, comprising opto-electric transducer means for scanning ink-free and inked areas of a printed image and generating corresponding signals of respective values, means for feeding the signal to a microprocessor having means for comparing the respective values of said signals with corresponding stored reference values, means for increasing dampening-medium feed when the scanning-signal values of the ink-free areas deviate from the reference values thereof, and means for storing a signal for reducing the dampening-medium feed when said scanning signal values of the inked areas deviate from said reference values thereof.

26. Device for performing a method of monitoring and/or controlling dampening-medium feed in an offset printing machine, comprising a measuring head having an opto-electric sensor, means for traversing said measuring head so as to scan a printed image having inked and ink-free areas therein, said measuring head having means for generating signals with values corresponding to the scanned areas, means for conducting said generated signals to a computer having means for comparing said signal values with corresponding stored reference values, and means for signalling a deviation of the values of said scanned signals from the corresponding reference values.

27. Device according to claim 26, including means for controlling adjusting elements to respectively increase and decrease dampening-medium feed when the scanning-signal values deviate from the corresponding reference values.

28. Device according to claim 26, wherein said sensor is a line sensor.

29. Device according to claim 26, wherein said sensor is an area sensor.

30. Device according to claim 26, wherein said computer has means for determining a position of an edge between the inked and the ink-free areas of the printed image from the signals generated by said signal-generating means in accordance with the scanning of said areas.

31. Device according to claim 29, wherein said line sensor is formed with a cylindrical lens having a curvature extending transversely to a longitudinal direction of said line sensor.

32. Device according to claim 29, including a screen monitor for displaying an enlargement of the respectively scanned areas thereon.

* * * * *